Figure 1:
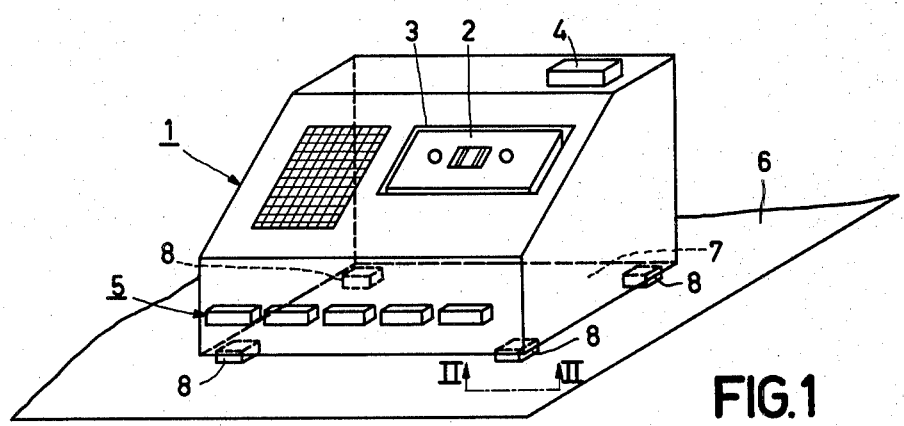

United States Patent [19]

Liebl

[11] 4,396,177

[45] Aug. 2, 1983

[54] SUPPORTING FOOT FOR A RECORDING AND/OR PLAYBACK APPARATUS

[75] Inventor: Friedrich Liebl, Vienna, Austria

[73] Assignee: U.S. Philips Corporation, New York, N.Y.

[21] Appl. No.: 203,162

[22] Filed: Nov. 3, 1980

[30] Foreign Application Priority Data

Nov. 27, 1979 [AT] Austria ............................ 7507/79

[51] Int. Cl.³ ............................................ F16M 13/00
[52] U.S. Cl. ................................ 248/615; 248/188.9
[58] Field of Search ............... 248/615, 632, 188.9, 248/188.8

[56] References Cited

U.S. PATENT DOCUMENTS

| | | | |
|---|---|---|---|
| 787,985 | 4/1905 | Hutchings | 248/615 |
| 938,883 | 11/1909 | Maier | 248/188.9 |
| 1,830,058 | 11/1931 | Helmond | 248/615 |
| 1,899,415 | 2/1933 | Guckes | 248/615 X |
| 1,909,671 | 5/1933 | Foothorap | 248/615 X |
| 2,088,566 | 8/1937 | Avery | 248/615 X |
| 3,865,050 | 2/1975 | Cecchetti | 248/188.9 X |

FOREIGN PATENT DOCUMENTS

| | | | |
|---|---|---|---|
| 1084009 | 1/1955 | France. | |
| 345505 | 5/1960 | Switzerland | 248/615 |
| 1099390 | 1/1968 | United Kingdom | 248/615 |

*Primary Examiner*—William E. Lyddane
*Assistant Examiner*—Sarah A. Lechok
*Attorney, Agent, or Firm*—David R. Treacy

[57] ABSTRACT

A supporting foot made of a unitary mass of elastic material for an apparatus which is to be placed onto a surface of a table, desk, etc. The foot has a large supporting surface and a recess surrounding an elastic projection which protrudes from the recess. The free end of the projection constitutes a small highly elastic supporting surface, which rests on the positioning surface in order to compensate for unevenesses of the table top or the apparatus.

4 Claims, 3 Drawing Figures

SUPPORTING FOOT FOR A RECORDING AND/OR PLAYBACK APPARATUS

The invention relates to a supporting foot for a recording and/or playback apparatus which can be placed on a positioning surface, which foot consists of an elastic material and comprises a protruding supporting member with a large substantially plane supporting surface. A plurality of such known supporting feet are mounted on the bottom walls of recording and/or reproducing apparatus so as to enable said apparatus to be placed on a table or desk-top surface etc. in a reliable and stable manner. Such a supporting foot generally consists of rubber, and elastic plastics or similar elastic materials ensuring a non-slip placement of the apparatus.

It has been found that a supporting foot of the type mentioned in the preamble often does not ensure a satisfactory placement of apparatus. When, if such supporting feet are employed, the positioning surface is only slightly uneven or the bottom wall of the apparatus to be placed is only slightly warped and thus uneven, this will result in an unstable position of the apparatus, so that it will be unsteady and will readily slip sideways. During operation of an apparatus this is inconvenient for the user of said apparatus and is experienced as annoying.

It is the object of the invention to construct a supporting foot of the type mentioned in the preamble so that in a simple and cheap manner a stable placement of an apparatus is guaranteed without wobbling or slipping. To this end the invention is characterized in that the supporting member has at least one recess which is circumferentially surrounded by said member, from which an elastic pin-shaped projection protrudes with its free end beyond the supporting surface of the supporting member, the projection being integral with (that is, formed of one mass of material including) the supporting member, the free end of said projection which protrudes from the large supporting surface of the supporting member constituting a further small supporting surface. This ensures that in the case of an uneven positioning surface for an apparatus or an uneven bottom wall of said apparatus at least one supporting foot of the apparatus rests on the positioning surface with the small supporting surface of the elastic projection which protrudes from the supporting member. The elasticity of the projection which protrudes from the supporting member ensures that the said unevenesses are compensated for, so that always a firm and stable placement of the equipment is guaranteed. If an apparatus having such supporting feet is placed onto a perfectly level positioning surface and its supporting wall is also perfectly plane, the projections are elastically pressed into the recesses of the supporting members of the supporting feet, so that the apparatus again rests on the positioning surface with the large supporting surfaces of the supporting members of the supporting feet. The compressed elastic projections then cause an increased friction relative to the positioning surface and thus also reduce the risk of an undesired displacement of an apparatus. As is apparent from the foregoing, the invention provides a supporting foot, which always ensures a reliable and satisfactory placement of equipment, which is of particular importance inter alia with respect to a reliable and convenient operation of the equipment.

It is found to be particularly advantageous if the wall of the recess in the supporting member is slightly spaced from the pin-shaped projection and serves as a stop surface for the pin-shaped projection in the case of a movement of said projection relative to the supporting member in a direction which is substantially parallel to the supporting surface of the supporting member. This virtually precludes a to-and-fro movement of the projection relative to the supporting member when an apparatus is subject to a lateral load, so that also in that case a particularly steady and reliable placement of the apparatus is achieved, if at least one supporting foot rests on the positioning surface with the small supporting surface of its projection.

A supporting foot may comprise a plurality of such elastic projections, which should each be accommodated in a corresponding recess. Such a projection may be essentially cylindrical, the recess in the supporting member then having a corresponding hollow cylindrical shape. Other shapes are also possible for the projections, preferably frusto conical.

The invention will be described in more detail with reference to the drawing which shows an embodiment to which it is not limited.

Figure 2:
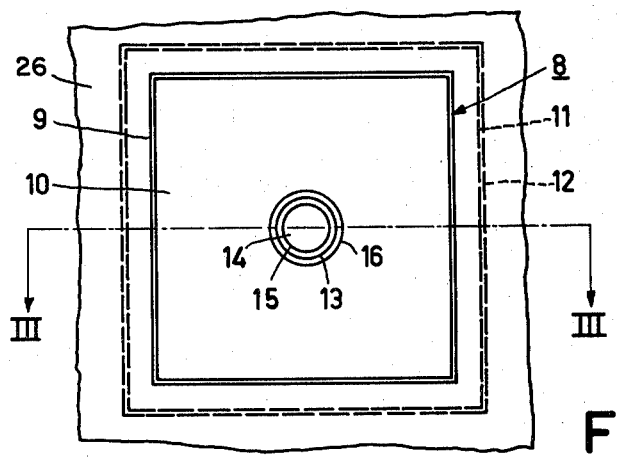
Figure 3:
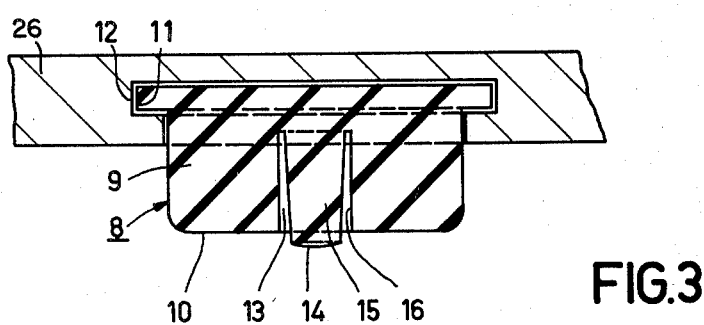

FIG. 1 is a perspective view of a recording and/or reproducing apparatus for a record carrier tape accommodated in a cassette, which apparatus is placed on a positioning surface by means of four supporting feet, FIG. 2 is a bottom view of a supporting foot on the line II—II in FIG. 1 on an enlarged scale in comparison with FIG. 1, and FIG. 3 is a cross-sectional view of the supporting foot of FIG. 2 taken on the line III—III in FIG. 2.

FIG. 1 shows a recording and/or reproducing apparatus 1, which is adapted to cooperate with a record carrier tape accommodated in the cassette 2. The cassette 2 can be inserted into a box-shaped cassette holder 3, from which the cassette can be removed by actuation of an ejection button 4. For the operation of the apparatus and for selecting the various apparatus functions said apparatus is equipped with a schematically represented set of pushbuttons 5. Obviously, the apparatus comprises further elements, but these are not described in more detail because they are irrelevant in the present context.

For placing the apparatus on a positioning surface 6 of a table, a desk of the like the apparatus comprises four supporting feet 8 arranged near the corners of said apparatus. For a reliable and correct operation of the apparatus it is of importance that the apparatus occupies a firm and steady position on the positioning surface 6. For example, when the ejection button 4 is actuated the apparatus should not wobble. Moreover, when the keys of the push-button unit 5 are actuated the apparatus should always remain in a steady and fixed position. In order to achieve this, the apparatus 1 is equipped with supporting feet, one of which is shown in FIGS. 2 and 3.

The supporting foot 8 shown in FIGS. 2 and 3 consists of an elastic material and comprises a protruding supporting member 9 with a large substantially plane supporting surface 10. In a cross-sectional view parallel to the bottom wall 26 of the apparatus the supporting member 9 has a square cross-section in the present case, as can be seen in FIG. 2. This cross-section may alternatively be rectangular, circular, elliptical etc. A mounting rim 11, which is integral with the supporting member 9, is provided on the circumference of said member at the end which is remote from the supporting surface 10, by means of which rim the supporting foot 8 is retained in a continuous groove 12 in the bottom wall 26.

In the present case the supporting member has one centrally disposed cylindrical recess 13, which is circumferentially surrounded by the supporting member itself. Said recess 13 accommodates an elastic pin-shaped projection 15, which projects from the supporting surface 10 of the supporting member 9 with its free end 14 and which is integral with the supporting member 9. The projection 15 is slightly conical, so that it tapers slightly towards its free end 14. The free end 14 of the projection 15 which projects from the large supporting surface 10 of the supporting member 9 constitutes a further small supporting surface, by means of which the supporting foot 8 can co-operate with the positioning surface 6.

As is in particular apparent from FIG. 3, the wall 16 of the recess 13 of the supporting member is slightly spaced from the pin-shaped projection 15 and the wall 16 serves as a stop surface for the pin-shaped projection in the case of a movement of said projection relative to the supporting member in a direction which is substantially parallel to the supporting surface of the supporting member. If the projection is moved laterally relative to the supporting member, the projection will immediately strike against the wall 16 of the recess 13, so that such a lateral movement is minimized.

If the apparatus has a perfectly plane nonwarped bottom wall 7 and if the apparatus is placed on a perfectly plane positioning surface 6 with its four supporting feet 8 which are mounted on the bottom wall, the pin-shaped projections 15 of the supporting surface are elastically pressed into the recesses 13 of the supporting members 9 as a result of the co-operation with the positioning surface 6 until the free end 14 of each projection 15 is flush with the large supporting surface 10 of the corresponding supporting member. The apparatus 1 then rests on the positioning surface 6 with the large supporting surfaces 10 of the four supporting members 9, the compressed projections 15 increasing the friction relative to the positioning surface 6, thereby counteracting an undesired lateral movement of an apparatus if said apparatus is subject to a lateral load, as occurs during actuation of one of the buttons of the push-button unit 5.

However, if it is assumed that the bottom wall 7 of the apparatus is not plane owing to warping, internal stress and the like, or that the positioning surface 6 onto which the apparatus 1 is to be placed is not plane, these deviations can be compensated for by the projections 15. Depending on the shape and extent of the unevennesses of the bottom wall or positioning surface not every projection 15 is completely pressed into the recess 13 of the corresponding supporting member 9, but at least one of the projections will remain in a condition in which it at least partly projects from its recess 13. The free ends 14 of the projections 15, which project from the recesses, then act as supporting surfaces, which each rest on the positioning surface 6 and thus again ensure a firm and steady placement of the apparatus, without wobbling.

Even if the apparatus is subject to a load in a direction parallel to the positioning surface 6, for example when a button of the push-button unit 5 is actuated, a correct placement of the apparatus is ensured even in the case of unevennesses of the bottom wall 7 or of the positioning surface 6, at least one supporting foot of the apparatus resting on the positioning surface with the small supporting surface of each projection. If such a load occurs, only a minimal relative movement between the projection 15 and the corresponding supporting member 9 is possible, because its relative movement is limited, as already stated, because the wall 16 of the recess 13 of the supporting member 10 extends at a slight distance from the pin-shaped projection 15 and acts as a stop surface for the pin-shaped projection 15 and in the case of a movement of said projection relative to the supporting member in a direction which is substantially parallel to the positioning surface of the supporting member. As soon as the projection 15 engages with the wall 16 of the recess, which will serves as a stop surface for said projection, no further relative movement between the projection and the supporting member is possible. As a result of this, a movement of the apparatus caused by a lateral load exerted on the apparatus is limited to such an extent that it is hardly discernible by a user.

The supporting foot shown in FIGS. 2 and 3 consists of one piece, which is obviously very efficient and advantageous. As already stated, the supporting foot consists of an elastic material, for which rubber, an elastic plastic or the like may be used. It is evident that a suitable material should be selected, in order to obtain satisfactory results in respect of a firm and steady placement. On the one hand, the material should be sufficiently hard, in order to achieve a reliable and steady placement both on the supporting members and on the projections, and on the other hand it should be sufficiently soft so as to allow a suitable elastic deflection of the projections. In this respect for example rubber having a shore hardness of approximately 50 is found to be particularly suitable.

The dimensions of the supporting member and the projection of a supporting foot should be adapted to each other. For example, in a dictation apparatus as described with respect to FIG. 1 the foot may have a supporting member with a supporting surface of approximately $15 \times 15$ mm$^2$ and a height of approximately 5 mm, the free end of the projection projecting approximately $\frac{1}{2}$ to 1 mm from the supporting surface of the supporting member in the unloaded condition. Such a foot may advantageously have a radial clearance of approximately 1 mm or slightly more between the projection and the supporting surface, the recess depth being between 3 and 4 mm. It follows that a slight protrusion of the projection from the supporting member already ensures a reliable and steady placement of an apparatus.

As already stated in the foregoing, a series of modifications in respect of the design of such supporting feet are possible within the scope of the invention. This is especially so in respect of the number of projections of a supporting foot and the shape of the recesses and the projections accommodated therein. Also in respect of the choice of the material for such supporting feet various possibilities exist.

What is claimed is:

1. A supporting foot for an apparatus which can be placed on a positioning surface, comprising
   a raised supporting member consisting of a mass of elastic material and having a large substantially plane supporting surface, said member having a recess in said supporting surface, and a projecting member having a free end protruding from said recess beyond the large supporting surface, characterized in that said projecting member is a pin-shaped member, said supporting member and projecting member are formed from one mass of elastic material, and said recess is defined by a wall which circumferentially surrounds and is spaced from said projecting member.

2. A supporting foot as claimed in claim 1, characterized in that the wall (16) of the recess (13) of the supporting member (9) is slightly spaced from the pin-shaped projection (15) and serves as a stop surface for the pin-shaped projection in the case of a movement of said projection relative to the supporting member in a direction which is substantially parallel to the supporting surface (10) of the supporting member.

3. A supporting foot as claimed in claim 2, wherein the wall (16) of the recess (13) is cylindrical shaped and the pin-shaped projection (15) is conical shaped, tapering toward its free end (14).

4. A supporting foot as claimed in claim 1, 2 or 3 wherein the recess (13) has a depth substantially greater than the radial clearance provided by the recess.

* * * * *